(12) United States Patent
Li et al.

(10) Patent No.: US 8,434,604 B2
(45) Date of Patent: May 7, 2013

(54) REVERSING TRANSMISSION

(75) Inventors: Shen-Chun Li, Taipei Hsien (TW);
Shou-Kuo Hsu, Taipei Hsien (TW);
Yung-Chieh Chen, Taipei Hsien (TW);
Hsien-Chuan Liang, Taipei Hsien (TW); Shin-Ting Yen, Taipei Hsien (TW); Hung Chao, Taipei Hsien (TW)

(73) Assignee: Hon Hai Precision Industry Co., Ltd., New Taipei (TW)

( * ) Notice: Subject to any disclaimer, the term of this patent is extended or adjusted under 35 U.S.C. 154(b) by 483 days.

(21) Appl. No.: 12/761,417

(22) Filed: Apr. 16, 2010

(65) Prior Publication Data

US 2011/0094334 A1 Apr. 28, 2011

(30) Foreign Application Priority Data

Oct. 26, 2009 (CN) .......................... 2009 1 0308810

(51) Int. Cl.
*F16D 41/10* (2006.01)
(52) U.S. Cl.
USPC .............................................. 192/21; 192/51
(58) Field of Classification Search ............ 192/51, 192/20, 21, 43.1, 43.2, 52.5
See application file for complete search history.

(56) References Cited

U.S. PATENT DOCUMENTS

| 745,337 | A | * | 12/1903 | Fagerstrom | ..................... 74/376 |
| 2,846,038 | A | * | 8/1958 | Brownyer | .................. 192/48.91 |
| 4,274,523 | A | * | 6/1981 | Sigg | ................................ 192/21 |

* cited by examiner

*Primary Examiner* — David D Le
*Assistant Examiner* — Ryan Dodd
(74) *Attorney, Agent, or Firm* — Altis Law Group, Inc.

(57) ABSTRACT

A reversing transmission includes a shaft, a retainer, a spacing collar, reversing members, two gears and two covers. The holder is sleeved on the shaft with spaced sliding notches formed thereon. The spacing collar is mounted on an outer surface of the retainer. The reversing members each include two spaced swing plates, with two reversed spiral teeth dented on two diagonal half surfaces of the two spaced swing plates. The reversing members slide into the sliding notches of the holder, with the two swing plates of each reversing member distributed at different sides of the spacing collar. Each of the gears has a group of spiral teeth formed on the inner side for engaging with the group of spiral teeth of the reversing members, and cogs formed on the outer circumference surface. The covers are mounted on two opposite ends of the holder to keep the reversing members in position.

11 Claims, 6 Drawing Sheets

REVERSING TRANSMISSION

BACKGROUND

1. Technical Field

The disclosure relates to transmissions for use in motor driven machines, and especially to a reversing transmission capable of changing gears automatically.

2. Description of Related Art

Reversing transmissions are used in industrial machines for changing gears in transmission system. Typically, the reversing transmission is manually controlled to select/exchange the gears in a transmission system, which requires an specially designed operation structure such a manual operation bar or buttons equipped to control the reversing transmission, but it is not quite in line with the trend of automatic processing in modern industry.

Therefore it is desirable to provide a reversing transmission that can operate automatically.

DETAILED DESCRIPTION

Figure 1:
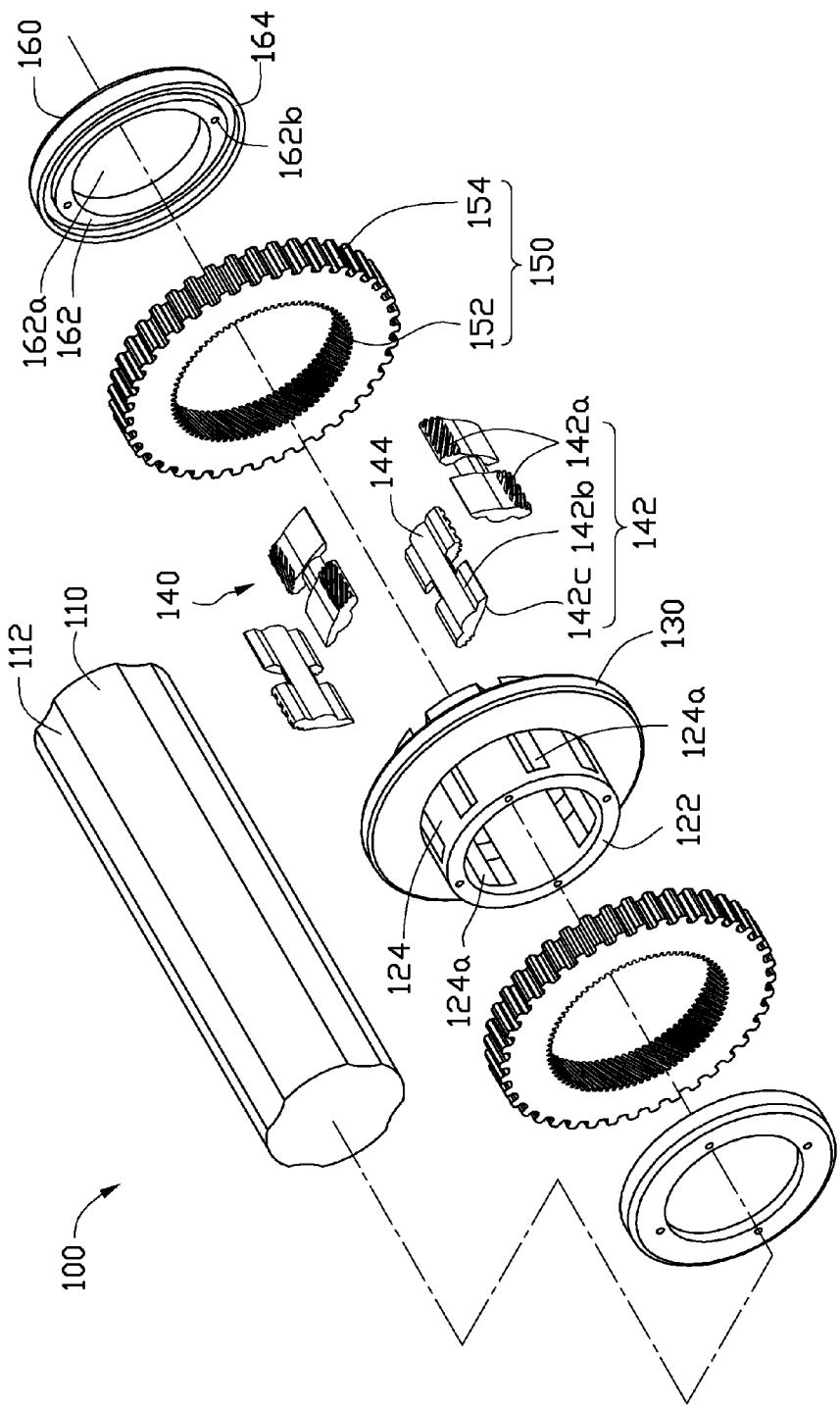
FIG. 1 is an exploded isometric view of a reversing transmission in accordance with one embodiment.
Figure 2:
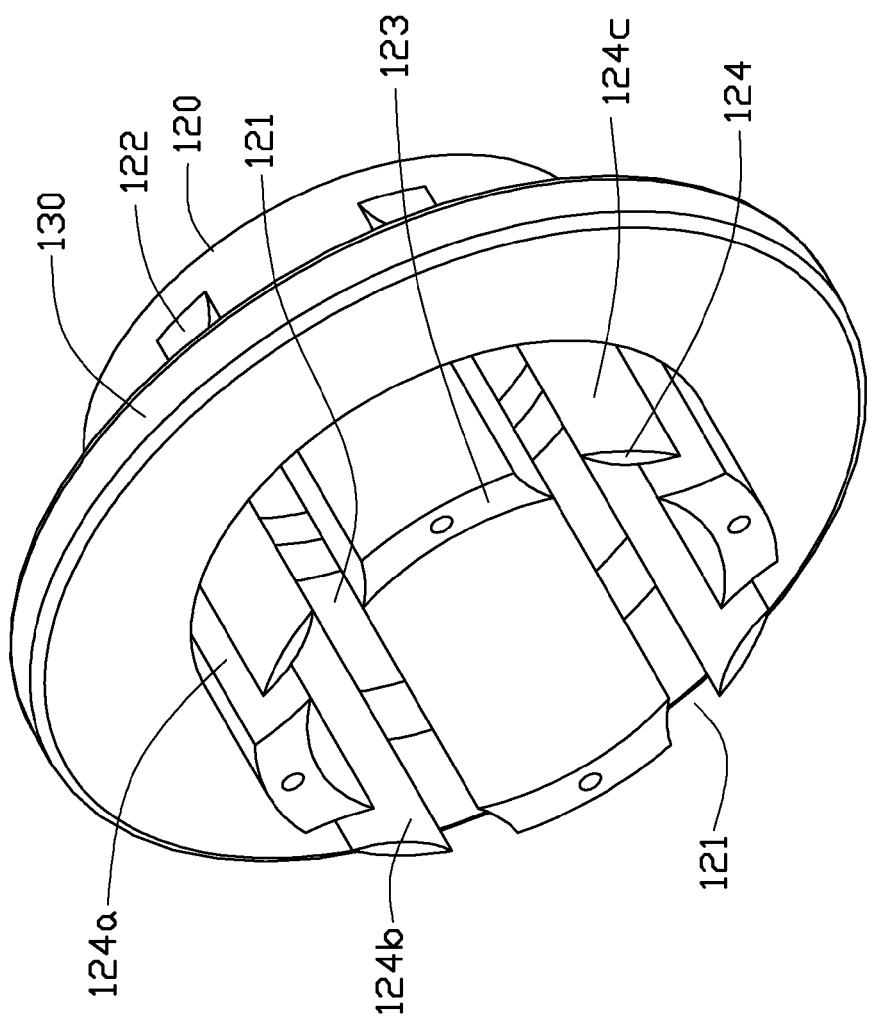
FIG. 2 is a partial, assembled isometric view of the reversing transmission of FIG. 1.
Figure 3:
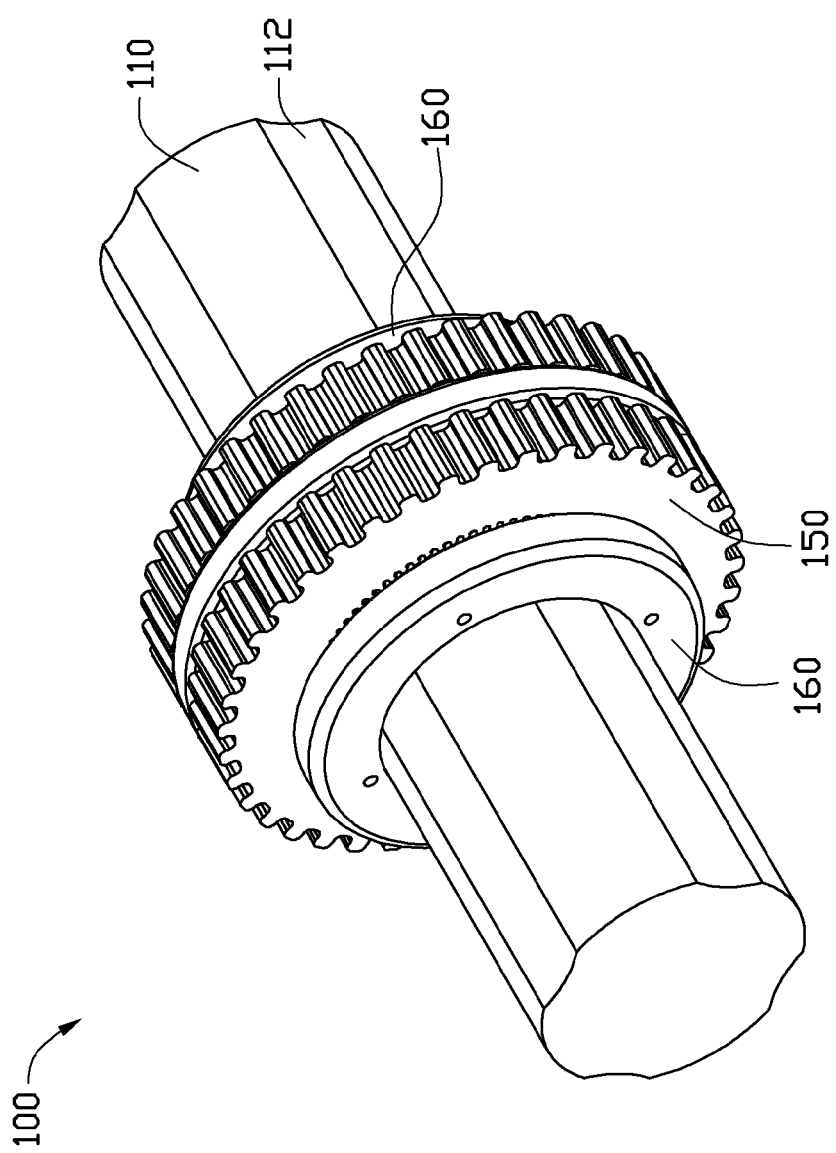
FIG. 3 is an isometric view of the of FIG. 1.

Referring to FIGS. 1 to 3, a reversing transmission 100 in accordance with an exemplary embodiment of the present disclosure is shown. The reversing transmission 100 includes a shaft 110, a holder 120, a spacing collar 130, a plurality of reversing members 140, two gears 150 and two covers 160. The holder 120 is substantially a hollow cylinder and sleeved on the shaft 110. A plurality of spaced sliding notches 121 is spaced throughout the holder 120, and is axially extended through one end of the holder 120. The spacing collar 130 is mounted on the outer surface of the holder 120. The reversing members 140 each include two swing plates 142 spaced from each other. Each of the swing plates 142 is divided into two regions, one of the regions formed with a group of spiral teeth 142a (hereinafter also called "the teeth region"). The two teeth regions 142a of each reversing member 140 are diagonally and symmetrically arranged. The reversing members 140 slide into corresponding sliding notches 121 of the holder 120, and the two swing plates 142 of each reversing member 140 are distributed at opposite sides of the spacing collar 130. Each of the gears 150 is annular shaped, and has a group of spiral teeth 152 formed on the inner side for engaging with the groups of spiral teeth 142a of the reversing members 140, and a group of cogs 154 formed on the outer side for engaging with other toothed members (not shown) for power transmission. The covers 160 are mounted on two opposite ends of the holder 120 to keep the reversing members 140 in position. When an external motor connected to the shaft 110 of the reversing transmission 100 is reversed in its rotating direction, the rotational direction of the shaft 110 will be reversed as well. At the initial moment of reversal of the shaft 110, the currently engaged swing plates 142 gradually descend relative to the shaft 110 to drive the engaged gear 150 apart from the spacing collar 130 until the swing plates 142 disengage from the gear 150. Meanwhile, the other swing plates 142 gradually elevate relative to the shaft 110, to engage with the spiral teeth 152 of the other gear 150 via the teeth regions. With the rotation of the reversing members 140, the other gear 150 is driven by the engagement of the swing plates 142, and the other gear 150 approaches the spacing collar 130 until the other gear 150 rests on the lateral surface of the spacing collar 130.

The drive shaft 110 is a long rod installed on a motor for transmission power or motion of the motor. The drive shaft 110 defines a plurality of uniformly spaced grooves 112 on its outer circumference surface. The grooves 112 extend along a direction parallel to the center axis thereof. Each of the grooves 112 is semilunar shaped with a curved bottom for receiving portions of a corresponding reversing member 140.

The holder 120 includes an annular base 122, a plurality of camber plates 123, and a plurality of bars 124 each with a fusiform cross section. The camber plates 123 are evenly distributed on a lateral surface of the annular base 122. The sliding notches 121 are defined between every pair of adjacent camber plates 123. The bars 124 are evenly distributed on the lateral surface of the annular base 122 and are received in the sliding notches 121. The bars 124 and the camber plates 123 are alternatingly arranged. A plurality of gaps 124a are defined between the bars 124 and the adjacent camber plates 122. Each of the bars 124 includes an arcuate inner surface 124b and an opposite curved outer surface 124c. Exemplarily, the lateral surfaces of each camber plates 123 are designed as smooth recessed shapes corresponding to the arcuate inner surfaces 124b of the adjacent bars 124.

The spacing collar 130 is positioned on the middle of the outer circumference surface of the holder 120, and can be fixed to the holder 120 through bolts or adhesive material.

Each of the reversing members 140 includes a semicircle cross-section roller 144 interconnecting the two swing plates 142 at two opposite ends of the roller 144. Each of the swing plates 142 is arciform shaped with a concave surface 142b fixed with the roller 144 and a convex surface 142c opposite to the concave surface 142b. The spiral teeth region 142a of each swing plate 142 is distributed on the convex surface 142c. The two spiral teeth regions 142 of the swing plates 142 of each reversing member 140 are arranged on two sides of the axis of the roller 144 correspondingly. In other words, the teeth regions 142 of the swing plates 142 of each reversing member 140 are diagonally arranged. It is to be noted that the extending direction of the tooth curves of the two groups of spiral teeth 142a of each reversing member 140 are consistent. The reversing members 140 are respectively sandwiched/embedded between the holder 120 and the shaft 110. The swing plates 142 of each reversing member 140 both are accommodated into one of the sliding notches 121. The convex surfaces 142c are resisted on the inner surfaces 124 of the bars 124, and the spiral teeth 142a are exposed from the gaps 124a. The roller 144 of each reversing member 140 is received in one of the grooves 112 of the shaft 110 and can be rotated in the grooves 112.

The gears 150 are respectively mounted on the holder 120 and are spaced from each other by the spacing collar 130. The two gears 150 have two groups of spiral teeth 152 which have consistent teeth directions.

Each of the covers 160 includes a circle plate 162 and a flange protruding from the annular periphery of the plate 162. The plate 162 defines a shaft hole 162a passing through the center of the plate 162 for the shaft 110 to extend through. A plurality of threaded holes 162b is defined in the plate 162 surrounding the shaft hole 162a, corresponding to a plurality of threaded holes (not shown), that are defined on one end of the holder 120 for allowing bolts to pass through to fix the cover 160 to the holder 120. Exemplarily, the space between the flange 164 and the spacing collar 130 is large enough for the gear 150 to move therein without any interference.

Figure 4:
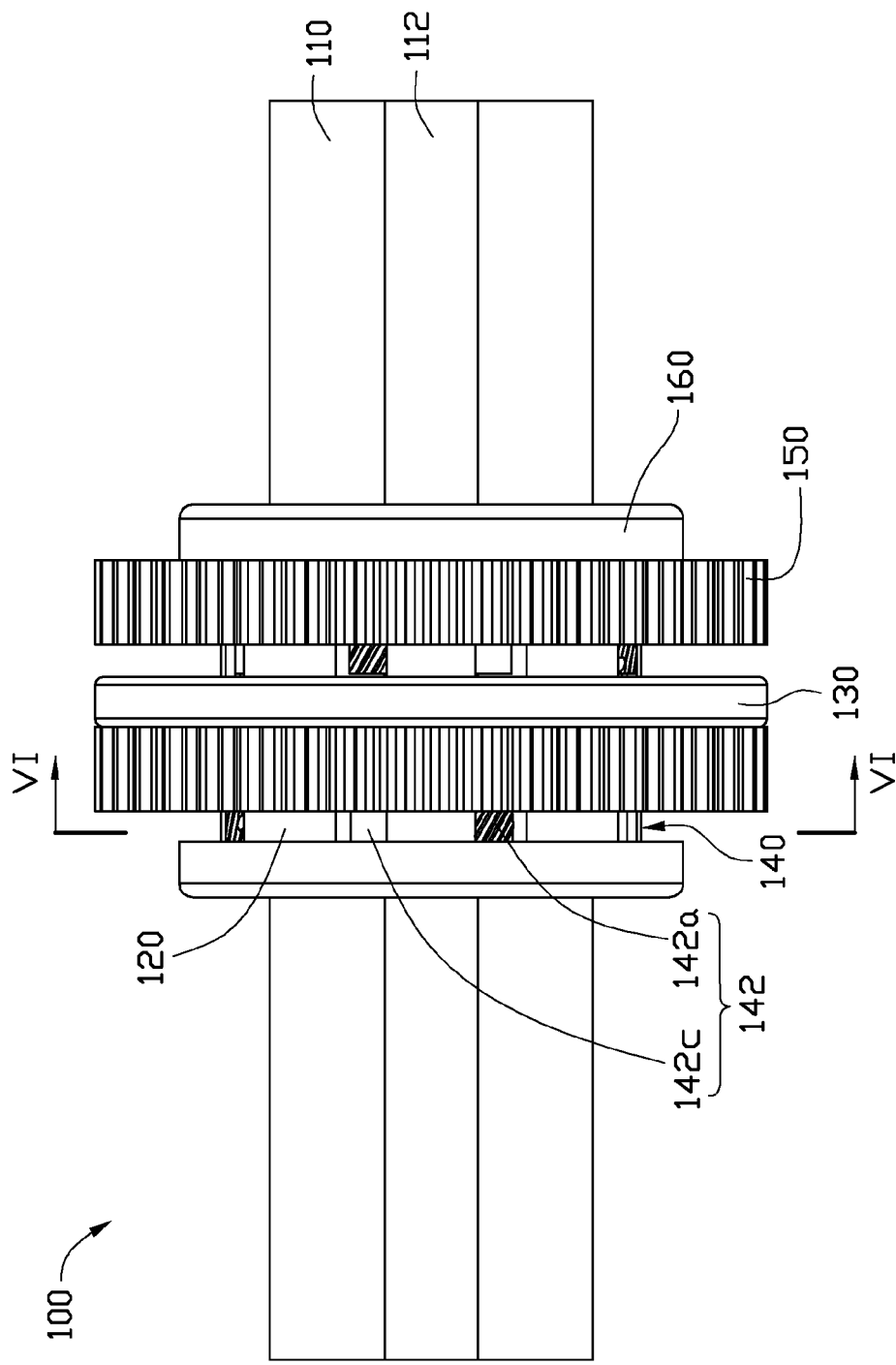
FIG. 4 is a side view of the reversing transmission of FIG. 1 in an assembled status.
Figure 5:
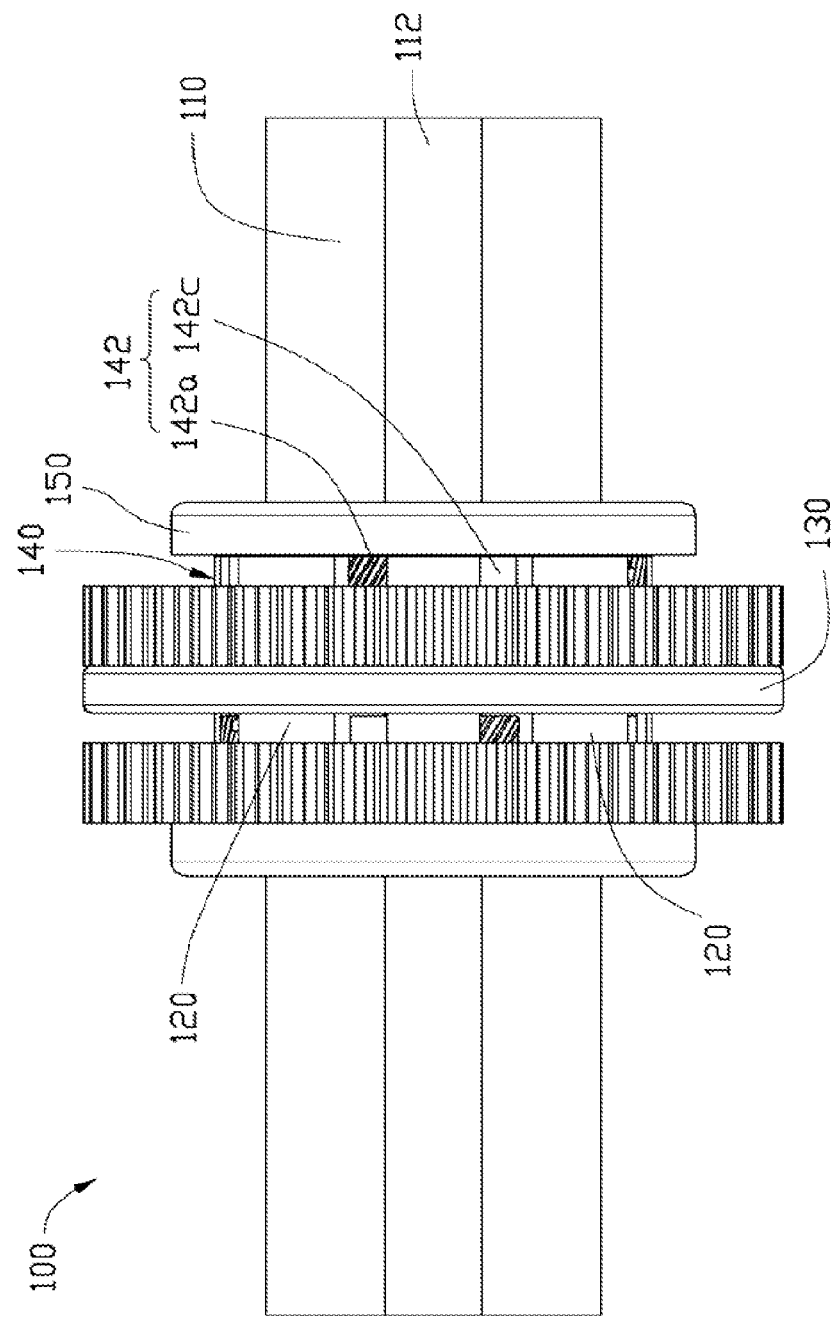
FIG. 5 is a side view of the reversing transmission of FIG. 1 in another assembled status.
Figure 6:
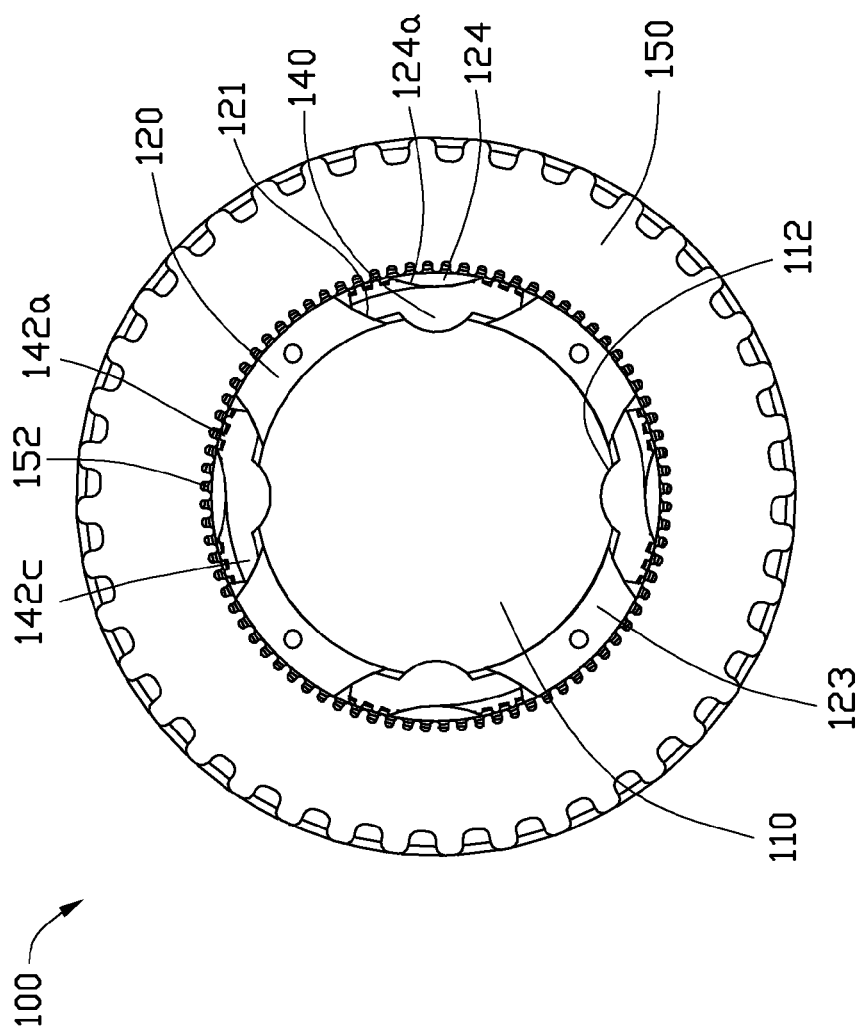
FIG. 6 is sectional view of the reversing transmission in a transitional status with two reversing member disengaged from the gears, taken along the line VI-VI in FIG. 4.

Referring to FIGS. 4-6, in use, the reversing transmission 100 is equipped into a power transmission system, such as a mechanical tool. The shaft 110 is driven to rotate by an external driving device such as a motor. The roller 144 of each reversing member 140 rotates with the shaft 110. When the external driving device reverses to change the rotational direction of the shaft 110, the load of the power transmission system makes the power transmission system keep its original status for a short time period, and the holder 120 maintains its current status for a short time. During this time, the reversing members 140 rotate over a small angle relative to the holder 120, the bars 124 of the holder 120 press the convex surfaces 142c of the swing plates 142 and make the reversing members 140 rotate relative to the grooves 112 of the shaft 110. Meanwhile, one of the swing plates 142 of each of the reversing members 140 automatically recedes into the gap 124a of the holder 120. At the same time, the other swing plate 142 of each of the reversing members 140 automatically elevates from another gap 124a of the holder 120 and engages with the spiral teeth 152 of the other gear 150 and rotates with the shaft 110. The groups of spiral teeth 152 of the two gears 150 are consistent, and the two teeth regions 142a of each reversing member 140 are consistent. Therefore, the gears 150 will be driven to move along the same axial direction of the shaft 110. If one of the gears 150 engages with one of the swing plates 142 of a reversing member 140 and moves towards the spacing collar 130, the other gear 150 will depart from the spacing collar 130 and automatically disengage from the other swing plate 142 of the reversing member 140.

In present disclosure, the reversing transmission 100 is capable of automatically switching gears 150 according to the rotational direction of the shaft 110, thereby releasing operators from manually operating the traditional reversing transmission to switch/change gears if it's desired.

It is believed that the present embodiments and their advantages will be understood from the foregoing description, and it will be apparent that various changes may be made thereto without departing from the spirit and scope of the disclosure or sacrificing all of its material advantages, the examples hereinbefore described merely being preferred or exemplary embodiments of the disclosure.

What is claimed is:

1. A reversing transmission comprising:
   a shaft;
   a holder sleeved on the shall with a plurality of spaced sliding notches throughout the wall of the holder and axially extending through an end of the wall;
   a spacing collar mounted on an outer circumference surface of the holder at the middle portion;
   a plurality of reversing members each comprising two spaced swing plates, wherein each of the swing plates is divided into two regions, one of the regions is formed with a group of spiral teeth, the groups of spiral teeth of the two swing plates are diagonally symmetrically arranged, the extending direction of teeth curves of the two groups of spiral teeth of each reversing member are consistent; and the reversing members are received in the corresponding sliding notches of the holder and the swing plates of each of the reversing members are distributed at opposite sides of the spacing collar;
   two gears each being annular shaped and comprising a group of spiral teeth with consistent teeth curves formed on the inner side for engaging with the groups of spiral teeth of the reversing members and cogs formed on the outer surface for engaging with an external toothed member for transmission power; and
   two covers mounted on two opposite ends of the holder to keep the reversing members in position;
   wherein a switch between the gears is executed when rotation of the shaft is reversed, and during the switch, currently engaged ones of the swing plates gradually descend relative to the shaft to drive an engaged one of the gears apart from the spacing collar until the engaged swing plates disengage from the engaged gear, meanwhile, non-engaged ones of the swing plates gradually elevate relative to the shaft to engage with the spiral teeth of a non-engaged one of the gears via the groups of spiral teeth of the non-engaged swing plates.

2. The reversing transmission of claim 1, wherein the shaft defines a plurality of uniformly spaced grooves on its outer surface along a direction parallel to the center axis thereof; and each of the reversing members comprises a semicircle cross-section roller interconnecting the two swing plates at two opposite ends and received in one of the grooves of the shaft.

3. The reversing transmission of claim 2, wherein each of the grooves is semilunar shaped with a curve shaped bottom supporting the semicircle cross-section roller.

4. The reversing transmission of claim 2, wherein the holder comprises an annular base, a plurality of camber plates, and a plurality of bars; the camber plates are evenly distributed on a lateral surface of the annular base; the sliding notches are defined between every pair of adjacent camber plates; the bars are evenly distributed on the lateral surface of the annular base and received in the sliding notches; and the bars and the camber plates are alternatively arranged.

5. The reversing transmission of claim 4, wherein each of the swing plates is arciform shaped and comprises a concave surface fixed with the roller and a convex surface opposite to the concave surface; each of the bars comprises an arcuate inner surface and an opposite curved outer surface; and the convex surfaces of the swing plates resist on the arcuate inner surfaces of the bars.

6. The reversing transmission of claim 5, wherein the lateral surfaces of each camber plate are designed as smoothly recessed shapes corresponding to the arcuate inner surfaces of the adjacent bars.

7. The reversing transmission of claim 5, wherein the group of spiral teeth of each swing plate is formed on the convex surface beside the roller; and the two groups of spiral teeth of the two swing plates of each reversing member are arranged on two sides of the axis of the roller correspondingly.

8. The reversing transmission of claim 5, wherein the group of spiral teeth of each swing plate is formed on the convex surface beside the roller; and the two groups of spiral teeth of the two swing plates of each reversing member are diagonally arranged.

9. The reversing transmission of claim 5, wherein a plurality of gaps is defined between the bars and the adjacent camber plates; and the swing plates of each reversing member are accommodated in one of the sliding notches with the two groups of spiral teeth exposed from the gaps.

10. The reversing transmission of claim 5, wherein each of the covers comprises a circle plate and a flange protruding from the annular periphery of the cover; the circle plate defines a shaft hole at the center for the shaft to pass through, and a plurality of threaded holes; and the threaded holes surround the shaft hole and correspond to the threaded holes defined on an end of the holder for allowing bolts to pass through to fix the cover to the retainer.

11. The reversing transmission of claim 10, wherein a gap between the flange and the spacing collar is large enough for the corresponding gear to move therein without any interference.

* * * * *